(12) United States Patent
Isoyama et al.

(10) Patent No.: US 7,301,477 B2
(45) Date of Patent: Nov. 27, 2007

(54) POWER SAVING WIRELESS TELEMETERING SYSTEM

(75) Inventors: Kazuhiko Isoyama, Tokyo (JP); Takahiro Ohkuma, Tokyo (JP); Daisuke Kawasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 339 days.

(21) Appl. No.: 10/967,256

(22) Filed: Oct. 19, 2004

(65) Prior Publication Data
US 2005/0122233 A1    Jun. 9, 2005

(30) Foreign Application Priority Data
Oct. 31, 2003    (JP)    ............................. 2003-372680

(51) Int. Cl.
*G08C 15/08*    (2006.01)
(52) U.S. Cl. ............................ 340/870.13; 340/870.07; 340/539.19
(58) Field of Classification Search ........... 340/870.11, 340/870.06, 870.07, 539.19, 870.13
See application file for complete search history.

(56) References Cited

U.S. PATENT DOCUMENTS

| | | | | |
|---|---|---|---|---|
| 5,767,791 A | * | 6/1998 | Stoop et al. | 340/870.11 |
| 6,208,247 B1 | * | 3/2001 | Agre et al. | 340/539.19 |
| 7,061,399 B2 | * | 6/2006 | Leck | 340/870.06 |

* cited by examiner

*Primary Examiner*—Albert K. Wong
(74) *Attorney, Agent, or Firm*—Foley & Lardner LLP

(57) ABSTRACT

Disclosed is a telemetering system that comprises a wireless base station and a number of wireless sensor nodes. Each wireless sensor node includes a solar cell, a sensor for producing observation data indicating a quantity being measured, a wireless interface for receiving the observation data from the sensor when the node is activated, and a time-schedule memory for storing time-schedule data. Control circuitry briefly activates its own node by supplying power from the solar cell to the wireless interface at periodic intervals according to the time-schedule data of the memory and briefly establishes a wireless link to the base station. During the time the wireless link is briefly established, the control circuitry of each node transmits the observation data to the base station and updates its time-schedule memory if it receives time-schedule data from the base station.

38 Claims, 9 Drawing Sheets

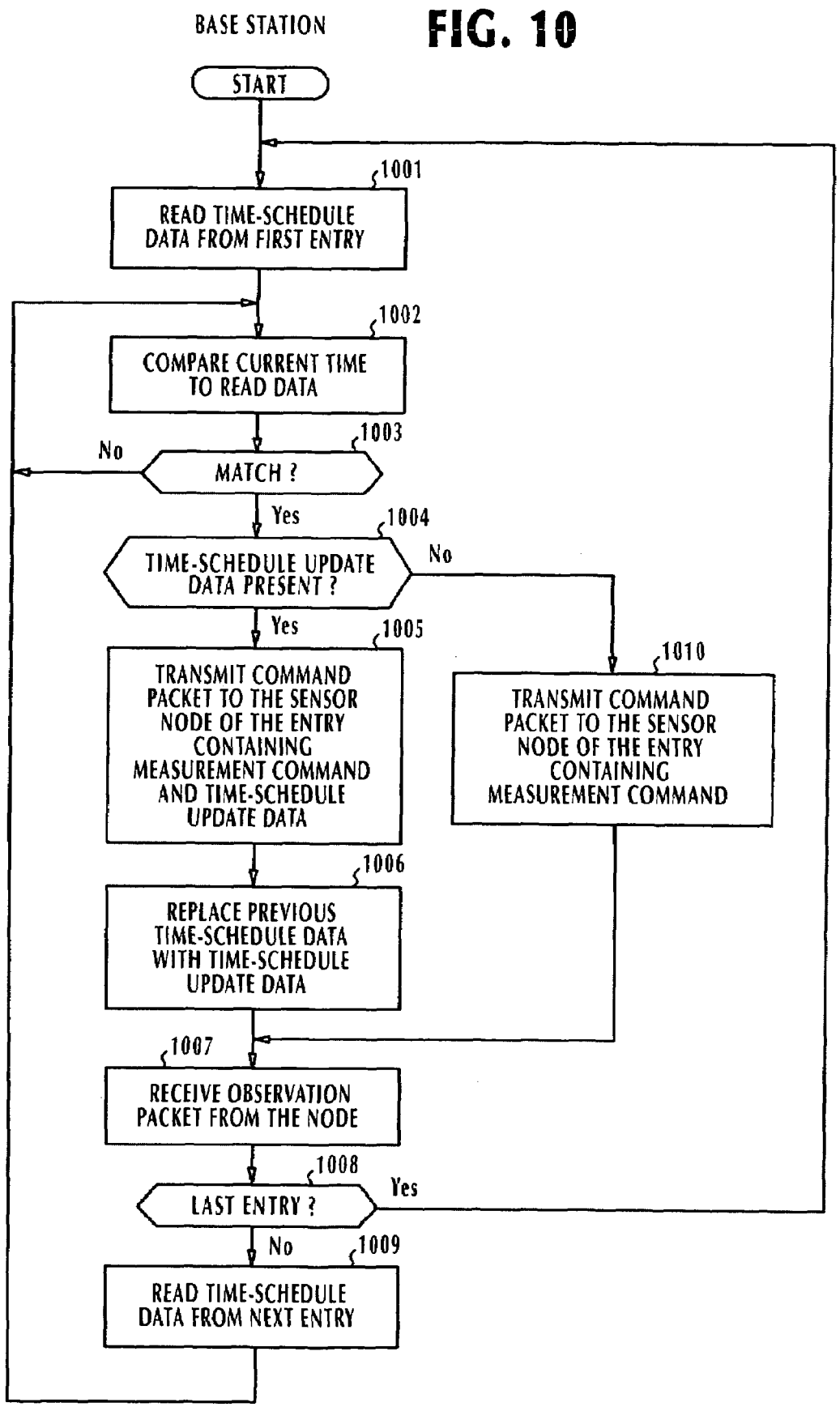

POWER SAVING WIRELESS TELEMETERING SYSTEM

BACKGROUND OF THE INVENTION

1. Field of the Invention

The present invention relates generally to telemetering systems, and more specifically to a wireless telemetering system in which observation data from remote sensor nodes are wirelessly collected at a central location at periodic intervals for power saving purposes.

2. Description of the Related Art

A known telemetering system comprises a plurality of wireless modules to perform measurement of physical quantities at remote locations. For power saving purposes, each sensor module is provided with a time-keeping device and the current time supplied from the device is constantly compared to power saving time-schedule. When the current time of day coincides with each successive instant of the time schedule, the sensor module is activated briefly and transmits a signal indicating a quantity being measured. Since the prior art sensor modules were designed to meet strict specifications that they must be of small design for less power consumption and be as less complex as possible for unattended operation, the power saving time schedule were manually set in each of the sensor modules at the time the system is initially started. Once the telemetering system became operational, it was impossible to update the time schedule of the remote sensor modules.

However, there is a need to control the power saving time schedule of each remote sensor module from a central location in a flexible manner. Further, there exists a need for controlling the sensor module to alter its process of measurement from the central location.

SUMMARY OF THE INVENTION

It is therefore an object of the present invention to provide a telemetering system in which the power saving time schedules of a plurality of wireless sensor nodes are set and controlled by a wireless base station when each sensor node is briefly activated.

According to a first aspect of the present invention, there is provided a telemetering system comprising a wireless base station and a plurality of wireless sensor nodes, each wireless sensor node including a power source, a sensor for producing observation data indicating a quantity being measured, a wireless interface for receiving the observation data from the sensor when the wireless sensor node is activated, a time-schedule memory for storing time-schedule data, and control circuitry for briefly activating the wireless sensor node by supplying power from the power source to the wireless interface at periodic intervals according to the time-schedule data of the memory to establish a wireless link to the base station, and updating the time-schedule memory according to time-schedule data received through the briefly established wireless link and transmitting the observation data from the activated wireless interface to the base station.

According to a second aspect of the present invention, there is provided a method of operating a plurality of wireless sensor nodes from a wireless base station, wherein each of the wireless sensor nodes includes a sensor for producing observation data indicating a quantity being measured, a wireless interface for establishing an individual wireless link to the base station when the wireless interface is activated, and a time-schedule memory, the method comprising, in each of the wireless sensor nodes, (a) establishing a wireless link between the wireless base station and the sensor node and setting time-schedule data from the base station into the time-schedule memory, (b) briefly activating the wireless sensor node by supplying power from a power source to the wireless interface at periodic intervals according to the time-schedule data of the time-schedule memory to establish a wireless link to the base station, (c) determining, at the briefly activated sensor node, whether time-schedule data is received from the base station, (d) if time-schedule data is received from the base station, updating the time-schedule memory with the received time-schedule data, (e) transmitting the observation data from the briefly activated sensor node to the base station, and (f) receiving the transmitted observation data at the base station.

According to a third aspect of the present invention, there is provided a method of operating a plurality of wireless sensor nodes from a wireless base station, wherein each of the wireless sensor nodes includes a sensor for producing observation data indicating a quantity being measured, a wireless interface for establishing an individual wireless link to the base station when the wireless interface is activated, and a time-schedule memory, the method comprising, in each of the sensor nodes, the steps of (a) establishing a wireless link between the wireless base station and the sensor node and setting time-schedule data from the base station into the time-schedule memory of the sensor node, (b) briefly activating the sensor node by supplying power from a power source to the wireless interface at periodic intervals according to the time-schedule data of the time-schedule memory to establish a wireless link to the base station, (c) transmitting a command packet from the base station to each of the briefly activated the sensor nodes, (d) receiving the command packet at each of the briefly activated sensor nodes, (e) determining, in each of the briefly activated sensor nodes, whether the command packet contains time-schedule data, (f) if the time-schedule data is contained in the command packet, updating the time-schedule memory of each the sensor node, (g) transmitting the observation data from each of the briefly activated sensor nodes to the base station, and (h) receiving, at the base station, the observation data transmitted from each of the briefly activated sensor nodes.

Preferably, each of the wireless sensor nodes comprises a node memory for storing an upstream node identifier and at least one downstream node identifier, and wherein the method further comprises, in each of the wireless sensor nodes, the steps of (1) determining whether the command packet is destined for a downstream wireless sensor node, (2) if the command packet is destined for the downstream wireless sensor node, (3) determining whether the command packet contains node identifiers corresponding to the node identifiers stored in the node memory, and (4) if the command packet contains the corresponding node identifiers, forwarding the command packet to the downstream wireless sensor node.

According to a fourth aspect of the present invention, there is provided a wireless sensor node for a telemetering system including a wireless base station which transmits power saving time-schedule data to a plurality of wireless sensor nodes, wherein the wireless sensor node is one of the plurality of wireless sensor nodes, the sensor node comprising a power source, a sensor for producing observation data indicating a quantity being measured, a wireless interface for receiving the observation data from the sensor when the wireless interface is activated, a time-schedule memory for storing time-schedule data, and control circuitry for briefly activating the wireless sensor node by supplying power from the power source to the wireless interface at periodic intervals according to the time-schedule data of the memory to establish a wireless link to the base station, and updating the time-schedule memory according to time-schedule data received from the base station through the established wireless link and transmitting the observation data from the activated wireless interface to the base station through the established wireless link.

BRIEF DESCRIPTION OF THE DRAWINGS

The present invention will be described in detail further with reference to the following drawings, in which:

FIG. 10 is a flowchart of the operation of the wireless base station.

DETAILED DESCRIPTION

Figure 1:
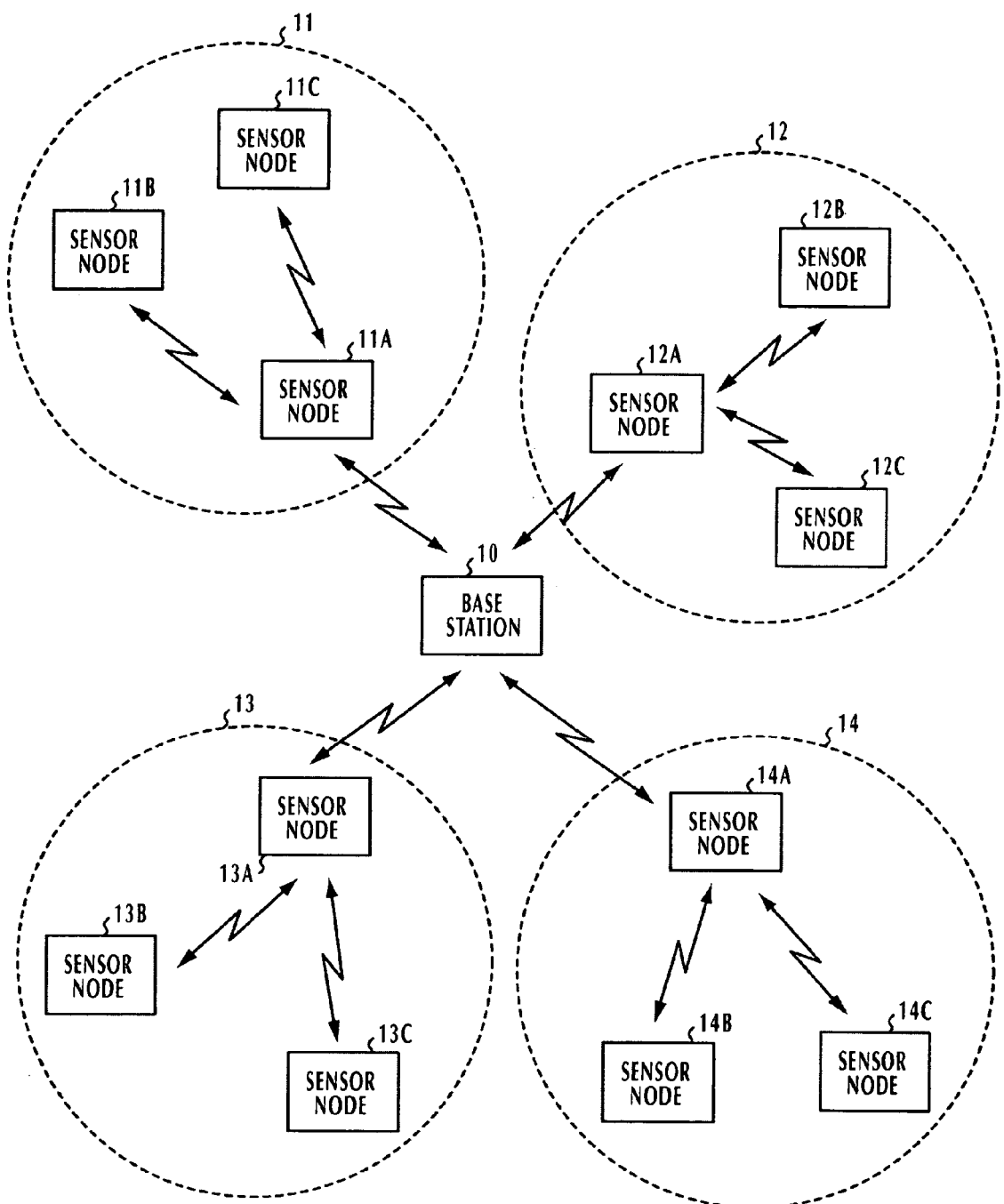
FIG. 1 is a block diagram of a wireless telemetering system of the present invention.

In FIG. 1, a wireless telemetering network of the present invention comprises a wireless base station or data collection center 10 and a plurality of groups 11, 12, 13 and 14 of wireless sensor nodes located at distances from the base station. The sensor nodes of each group are indicated by the letters A, B and C appended to their group number. In each of the groups 11 to 14, the sensor node A is nearest to the base station and the transmit power of the base station 10 is reachable only to these nearest sensor nodes 11A, 12A, 13A and 14A. Therefore, the base station 10 operates as an upstream node in the direction of its packet transmission, and in each group, the sensor node A operates as a repeater node for repeating the packet to the other nodes, or downstream nodes B and C. Likewise, in the opposite direction of transmission, the sensor node A repeats packets from the nodes B and C to the base station 10.

Figure 2:
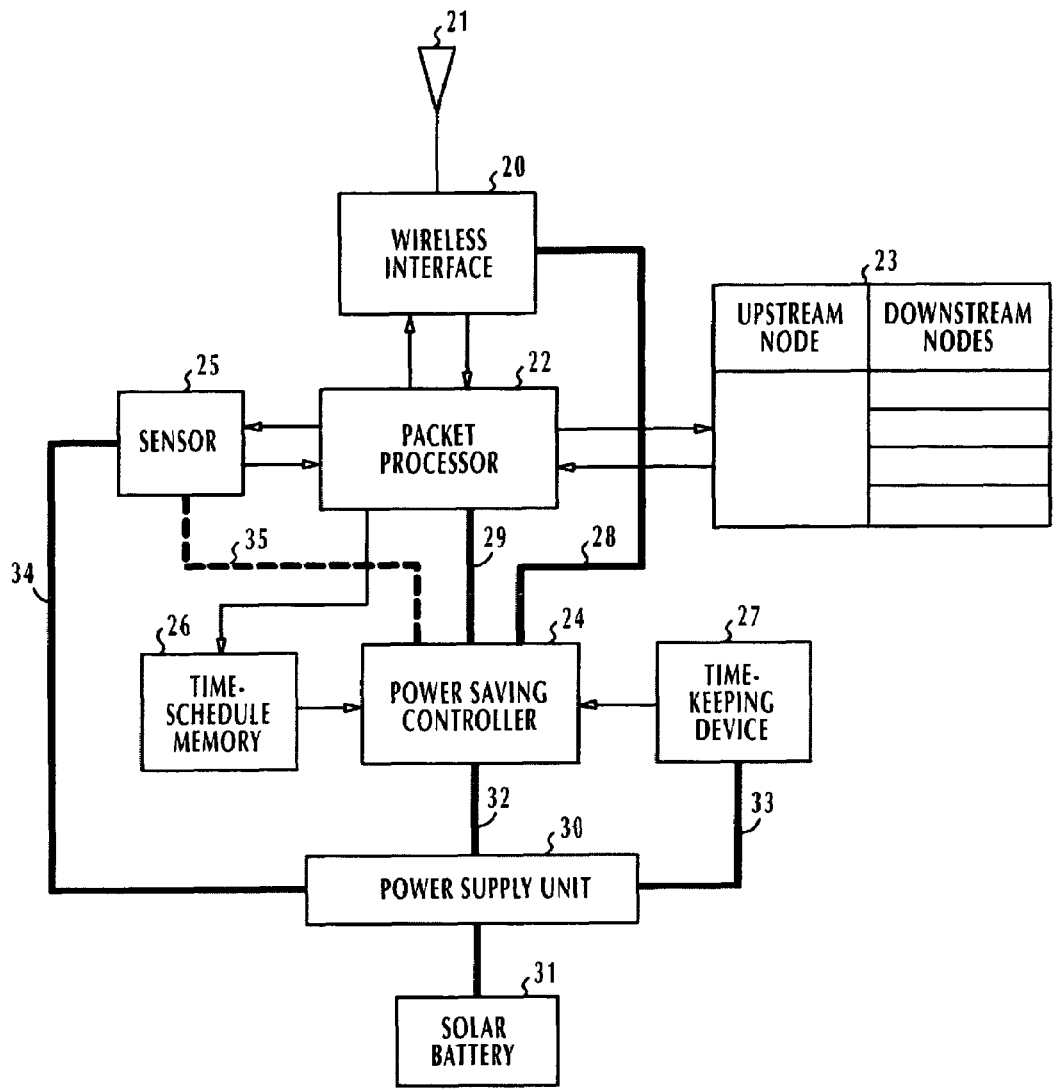
FIG. 2 is a block diagram of each of the wireless sensor nodes of the present invention.

As shown in detail in FIG. 2, each of the wireless sensor nodes includes a wireless transceiver or interface 20 that operates with an antenna 21 to establish a wireless link with a node that is within the reachable extent of the wireless interface 20. A packet processor 22 is connected to the wireless interface 20 for routing the packet according to topology data transmitted from the base station 10 and setting node identifiers of upstream and downstream nodes in a node memory 23. Additionally, the packet processor 22 provides the setting of power saving time-schedule data into a time-schedule memory 26. Packet processor 22 is connected to a sensor 25 that processes the readings of a measurement instrument into a digital signal according to a measurement command from the base station. Packet processor 22 transmits the digital signal from the sensor 25 to the base station 10. The measurement instrument may be a sunshine meter, a thermometer, an anemometer, and so on. For the purpose of disclosure, the following description proceeds with the assumption that the measurement instrument is a sunshine meter and the base station 10 is a data collection center for collecting the readings of the instruments and using the collected data for agricultural fieldwork.

Power saving controller 24 constantly compares current time of day supplied from a time-keeping device 27 to the time-schedule data stored in the time-schedule memory 26. Preferably, the time-keeping device 27 is tuned to a radio channel broadcasting the local standard time, or configured to receive GPS (global positioning system) signals from GPS satellites to produce a high-precision time-of-day data.

The time-schedule data indicates the timing offset from a reference timing (the beginning of the day, for example) for initially activating the wireless interface 20 and the packet processor 22 via power lines 28 and 29, respectively. The power saving time-schedule data further indicates a period between successive times at which both of the packet processor and the wireless interface are activated. Power saving controller 24 activates the packet processor and the interface for a predetermined interval sufficient to establish and maintain communication with the base station as well as with downstream nodes.

A power supply unit 30 is provided for receiving power from a solar cell 31 and supplies regulated power voltages to the power saving controller 24 and the time-keeping device 27 via power lines 32 and 33, respectively. Depending on the type of measurement instrument used, the sensor 25 is constantly powered by the power supply unit 30 via a power line 34 or intermittently powered via a power line 35 under control of the power saving controller 24.

Figure 3:
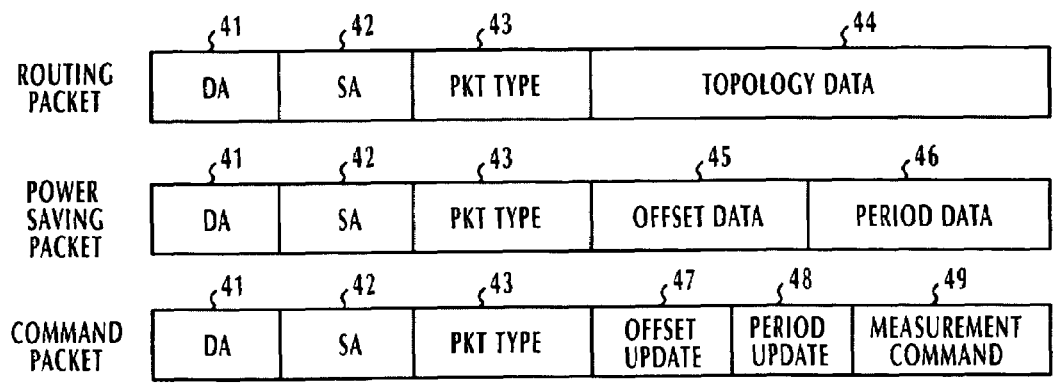
FIG. 3 is an illustration of the data structures of packets of different types transmitted from the base station.

FIG. 3 shows details of packets used in the telemetering system of the present invention. A routing packet and a power saving packet are used for transmission from the base station 10 at the time the network is initialized, and a command packet is used for transmission from the base station when each of the sensor nodes is briefly activated under control of its power saving controller 24. Each of these packets includes a destination address (DA) field 41, a source address (SA) field 42, a packet type field 43, and a payload field. The payload field of the routing packet contains topology data 44 indicating the topology of the network necessary for routing packets to and from the base station 10. The payload field of the power saving packet contains timing offset data ($T_{OFF}$) 45 and a period ($T_{PER}$) data 46. The payload field of the command packet contains timing offset update data 47, period update data 48 and measurement command data 49.

Figure 4:
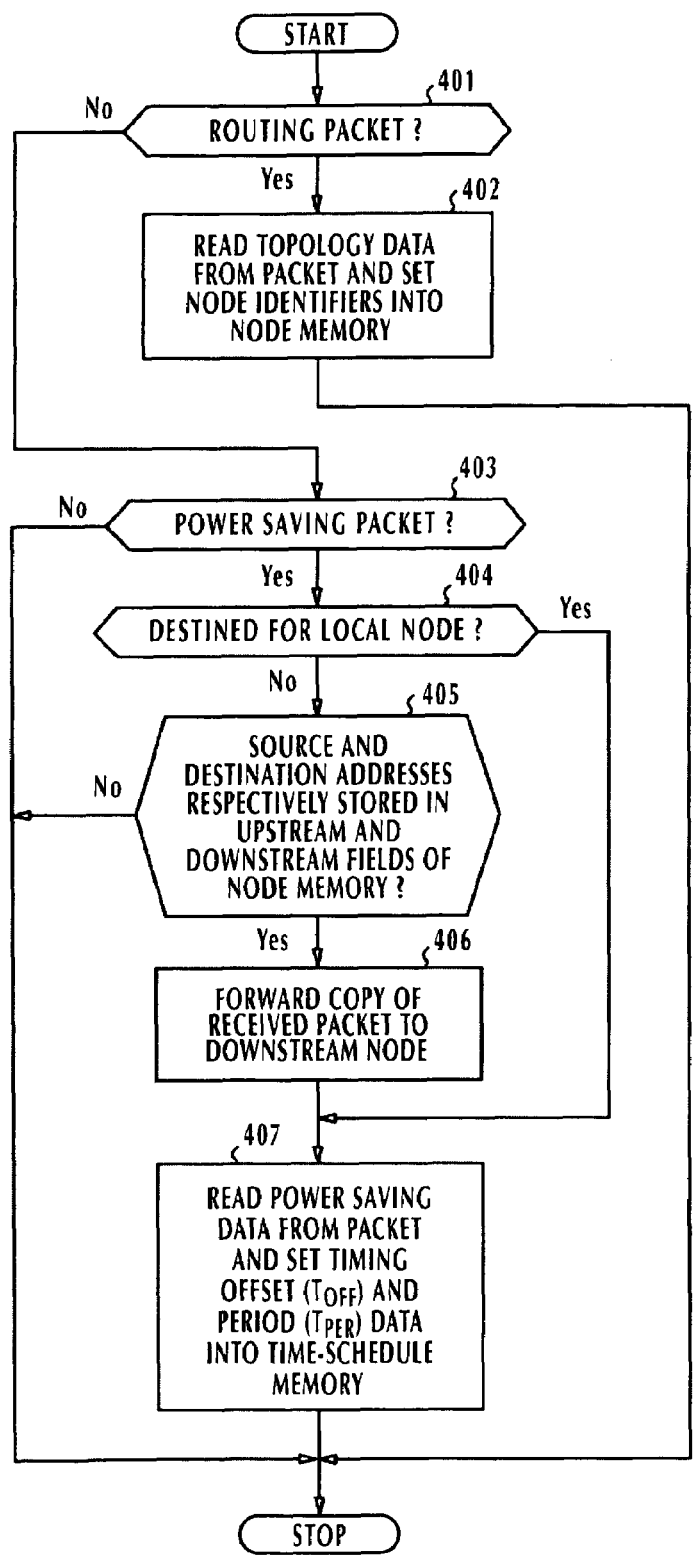
FIG. 4 is a flowchart of the operation of the packet processor of FIG. 2 during the time the system is initialized.

The operation of packet processor 22 during the initialization of the system proceeds according to the flowchart of FIG. 4.

When all the wireless sensor nodes are deployed within the area of the system, the base station 10 transmits a routing packet and each sensor node is set in an active state to receive packets. In response to a routing packet (step 401), each of the repeater nodes 11A, 12A, 13A, 14A reads and examines topology data contained in it and sets the identifiers of its upstream nodes and its downstream nodes into the respective fields of the node memory 23 (step 402) and returns to the starting point of the routine. If no routing packet is received, the packet processor 22 checks to see if a power saving packet has been received (step 403). If so, the packet processor proceeds to decision step 404 to determine if the received packet is destined for the local node itself. If the decision is affirmative at step 404, flow proceeds to step 407 to read the power saving data of the local node from the power saving packet (see FIG. 3) and sets the timing offset value $T_{OFF}$ and the period value $T_{PER}$ into the time-schedule memory 26.

If the received power saving packet is destined for a downstream node, the decision is negative at step 404 and flow proceeds to decision step 405 to determine whether the source and destination addresses of the received packet are respectively stored in the upstream and downstream fields of the node memory 23. If this is the case, it is determined that the local node is a repeater node. Since the repeater node is responsible for timely activating itself for repeating packets between its upstream and downstream nodes, the packet processor proceeds from step 405 to step 406 to forward the packet to the downstream node and then at step 407 to read the power saving data of the downstream node from the packet and sets it into the time-schedule memory 26. After executing step 407, flow returns to the starting point of the routine.

Figure 5:
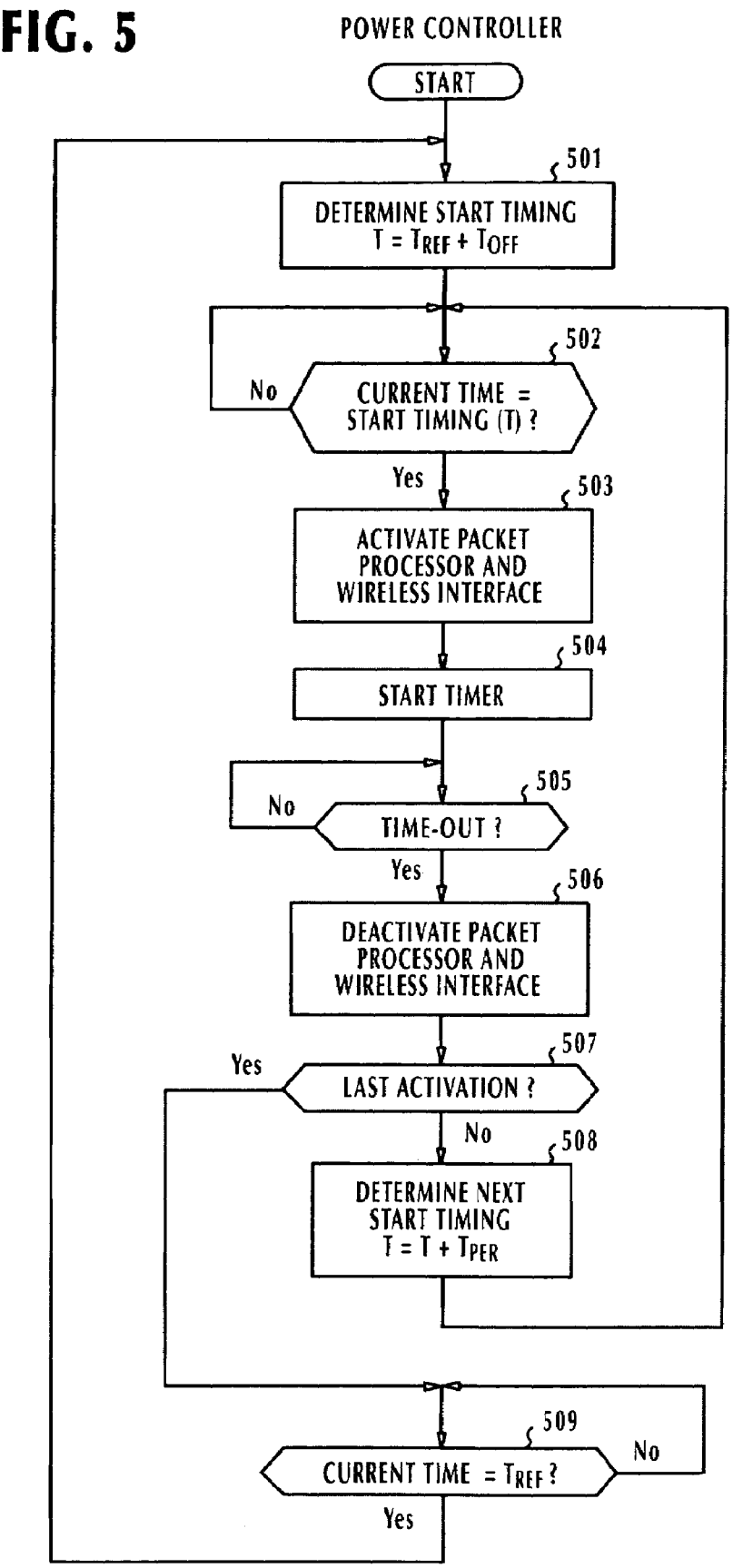
FIG. 5 is a flowchart of the operation of the power controller of FIG. 2 for briefly activating the associated packet processor and the wireless interface for power saving purposes.

After the telemetering system is initialized, the power controller 24 operates according to the flowchart of FIG. 5.

At step 501, the power controller 24 reads the power saving data of its own node from the time-schedule memory 26 and determines the initial start timing "T" of the node by adding the timing offset value $T_{OFF}$ to the timing reference $T_{REF}$. At step 502, the current time supplied from the time-keeping device 27 is compared to the determined initial start timing. When the current time becomes equal to the initial start timing, the decision at step 502 is affirmative and the power controller 24 proceeds to step 503 to activate the packet processor 22 and the wireless interface 20 and starts up a timer (step 504). When a predefined time-out period expires (step 505), the power controller 24 deactivates the packet processor and the wireless interface (step 506). At step 507, the power controller 24 determines whether the activation of its own node is the last for the day. If the decision is negative, flow proceeds to step 508 to read the power saving data from the time-schedule memory 26 and the power controller determines the next start timing T by adding the period $T_{PER}$ to the previous start timing T, and flow returns to step 502 to repeat the process for the next activation cycle.

If the current activation is the last one, flow proceeds from step 507 to decision step 509 to determine if the current time is equal to the reference timing $T_{REF}$. If this is the case, flow returns to step 501 to repeat the routine all over again.

In this way, each sensor node is periodically activated for power saving purposes. If the timing offset is five minutes and the period between activations is one hour, the power saving controller 24 starts activating its packet processor and wireless interface at times of day 00:05, 01:05, 02:05, . . . , and so on.

Figure 6:
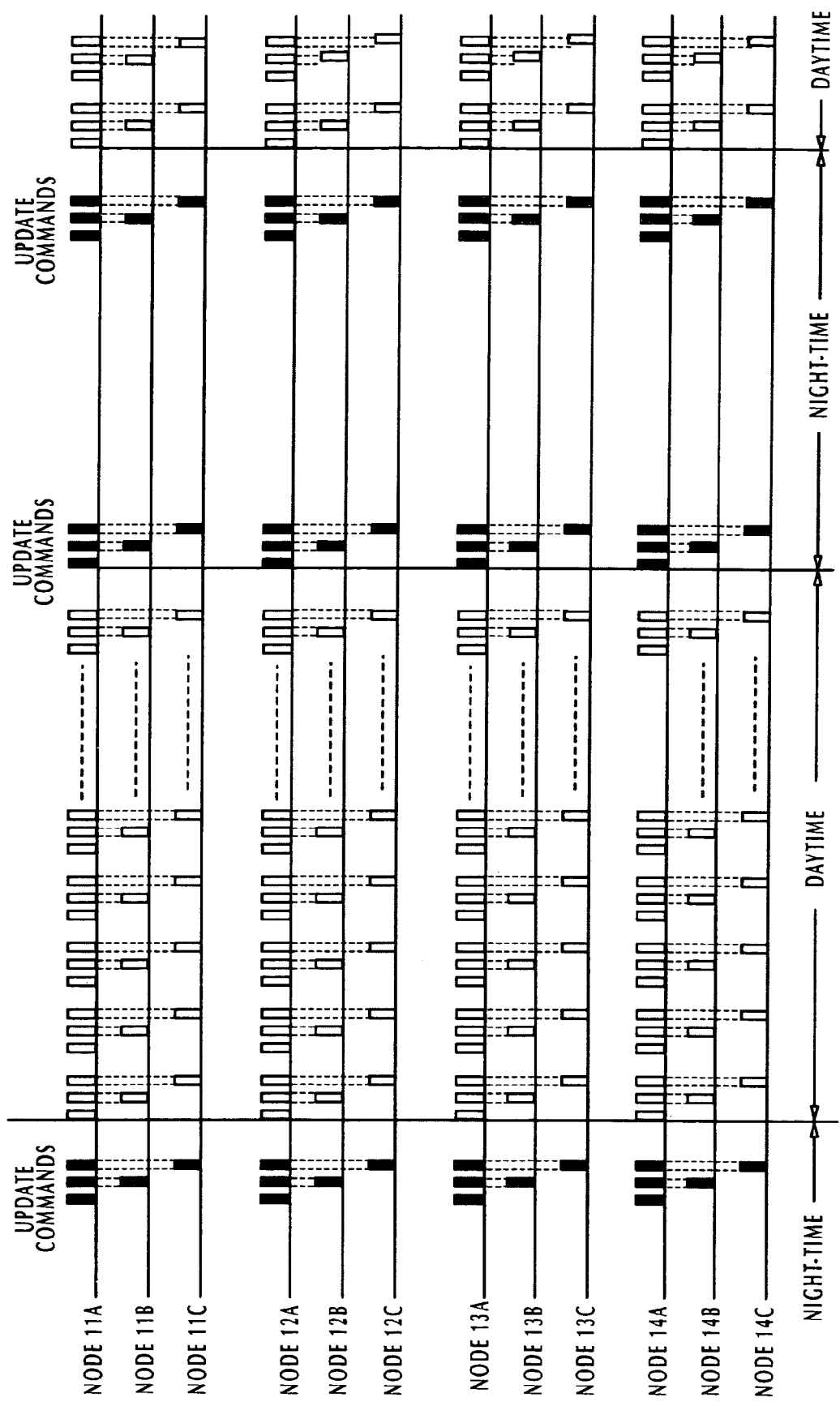
FIG. 6 is a timing diagram of the telemetering system when each sensor node is activated according to one embodiment of the present invention.

When a sensor node is activated, it establishes communication with the base station for transmitting its measurement result and updating the power saving timing schedule if necessary, as will be described in detail later. Since each repeater node (11A, 12A, 13A, 14A) is required to forward a packet downstream when one of its downstream nodes is activated, the repeater node goes active simultaneously with the downstream node, as illustrated in FIG. 6.

Since sunshine meters are used in the illustrated embodiment, they are rendered inactive during the nighttime. To this end, the period data $T_{PER}$ of each sensor node is updated by lengthening its value at the beginning of the nighttime so that each node is rendered inactive until the next early morning, whereupon the period data is updated again by shortening its value.

If there is no signal interference between adjacent groups, the sensor nodes of each group can be activated independently of those of adjacent groups. In this case, the sensor nodes of all groups can be operated in substantially the same activation time schedules. Specifically, all groups of sensor nodes use the same set of timing offset values as illustrated in FIG. 6.

Figure 7:
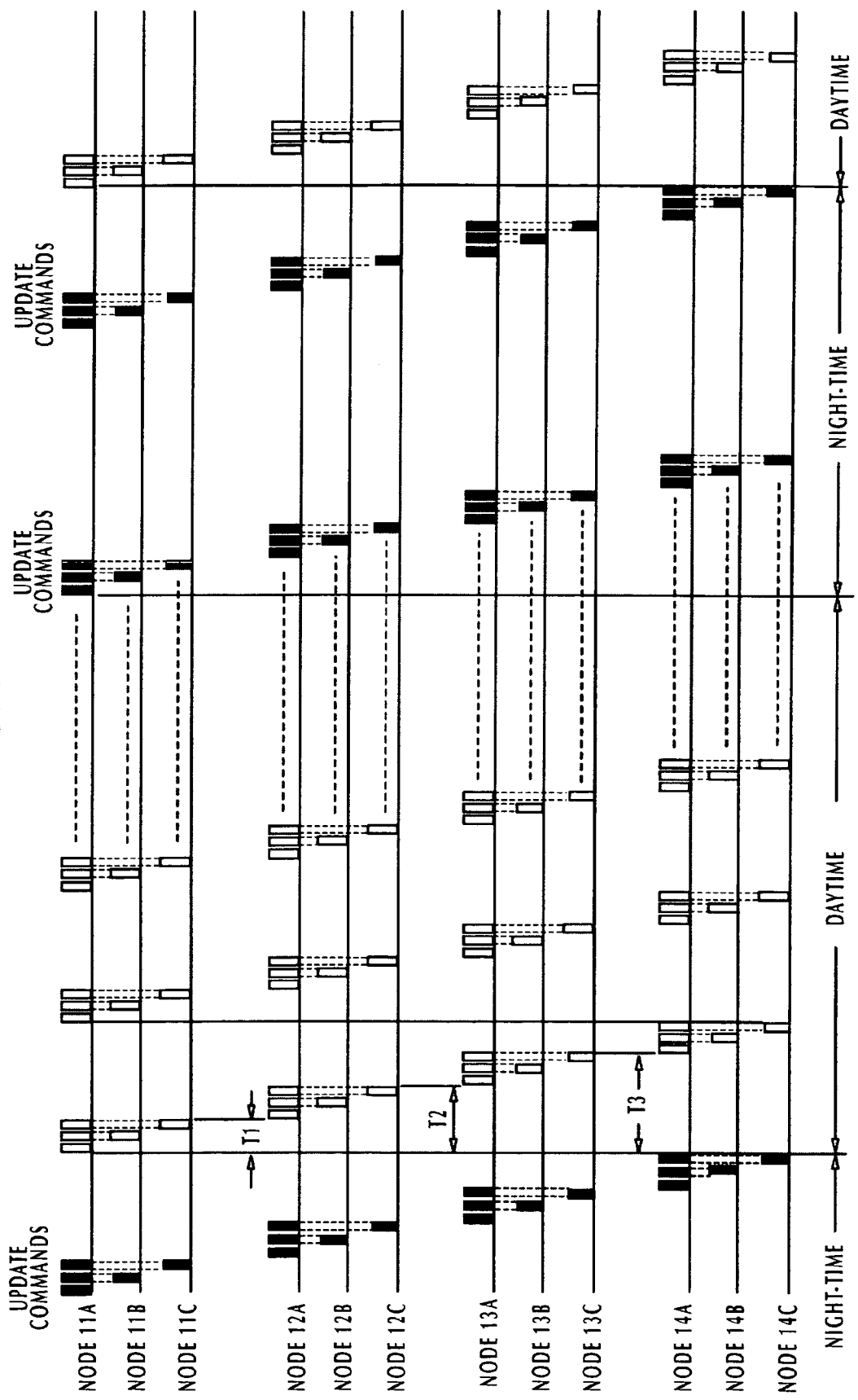
FIG. 7 is a timing diagram of the telemetering system when each sensor node is activated according to another embodiment of the present invention.

However, if interference is likely to occur between adjacent groups, collisions may occur between transmitted packets. In such instances, it is preferable that all or adjacent groups use a different set of timing offset values as illustrated in FIG. 7. Specifically, the start timings of groups 11, 12, 13 and 14 are offset by 0, T1, T2 and T3, respectively.

Figure 8:
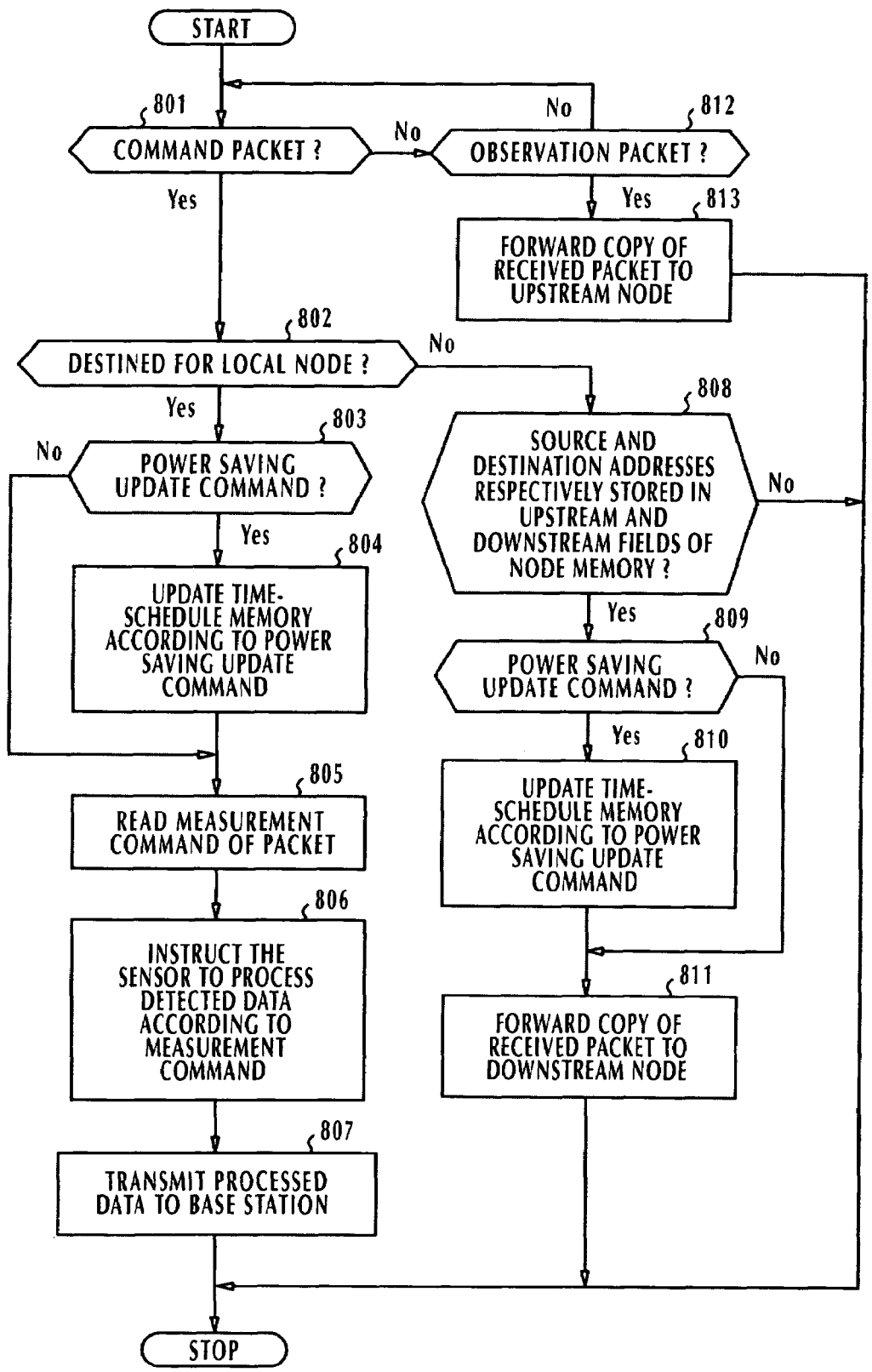
FIG. 8 is a flowchart of the operation of the packet processor when activated by the power controller to receive a command packet from the base station and transmit observation data to the base station.

When a sensor node is activated, the packet processor 22 of this node operates according to the flowchart of FIG. 8.

Since the base station 10 maintains the time-schedules of all sensor nodes of the system, it timely transmits a command packet to each sensor node during the time this sensor node is activated.

When a sensor node receives a command packet (step 801), the packet processor 22 checks to see if the packet is destined for the local node (step 802). If the packet is destined for the local node, flow proceeds to step 803 to determine whether the received packet contains a power saving update command or not. If the received packet contains a power saving update command, flow proceeds to step 804 to update the time-schedule memory 26 according to the power saving update command and proceeds to step 805 to read a measurement command from the received packet (step 805). At step 806, the packet processor 22 instructs the sensor 25 to process the measured data according to the measurement command from the base station. More specifically, the sunshine meter produces an analog output signal, which is sampled at intervals and each sample value is then converted to a corresponding digital signal. Digital signals generated during a given interval of time are integrated, and then an average value is calculated by dividing the integrated value by the number of sample values generated in that given interval. The measurement command specifies the sampling interval, for example.

The processed observation data is transmitted to the base station 10 at step 807.

If the received command packet is destined for another node, flow proceeds from step 802 to step 808 to look up the node memory 23 to determine whether the source and destination addresses of the received command packet are respectively stored in the upstream and downstream fields of the node memory 23. If this is the case, it is determined that the local node is responsible for transmitting the packet to a downstream node and flow proceeds to step 809 to check to see if the packet contains a power saving update command. If so, flow proceeds to step 810 to update the time-schedule memory 26 according to the update command of the downstream node. At step 811, the packet processor 22 transmits the received command packet to the downstream node. If no power saving update command is contained in the received command packet, step 810 is skipped.

If the decision at step 801 is negative, the packet processor proceeds to step 812 to determine whether an observation packet is received from a downstream node. If not, it returns to step 801 to monitor incoming packets. If an observation packet is received from a downstream node, the packet processor proceeds from step 812 to step 813 to forward a copy of the observation packet to the upstream node of the local node and returns to step 801.

Figure 9:
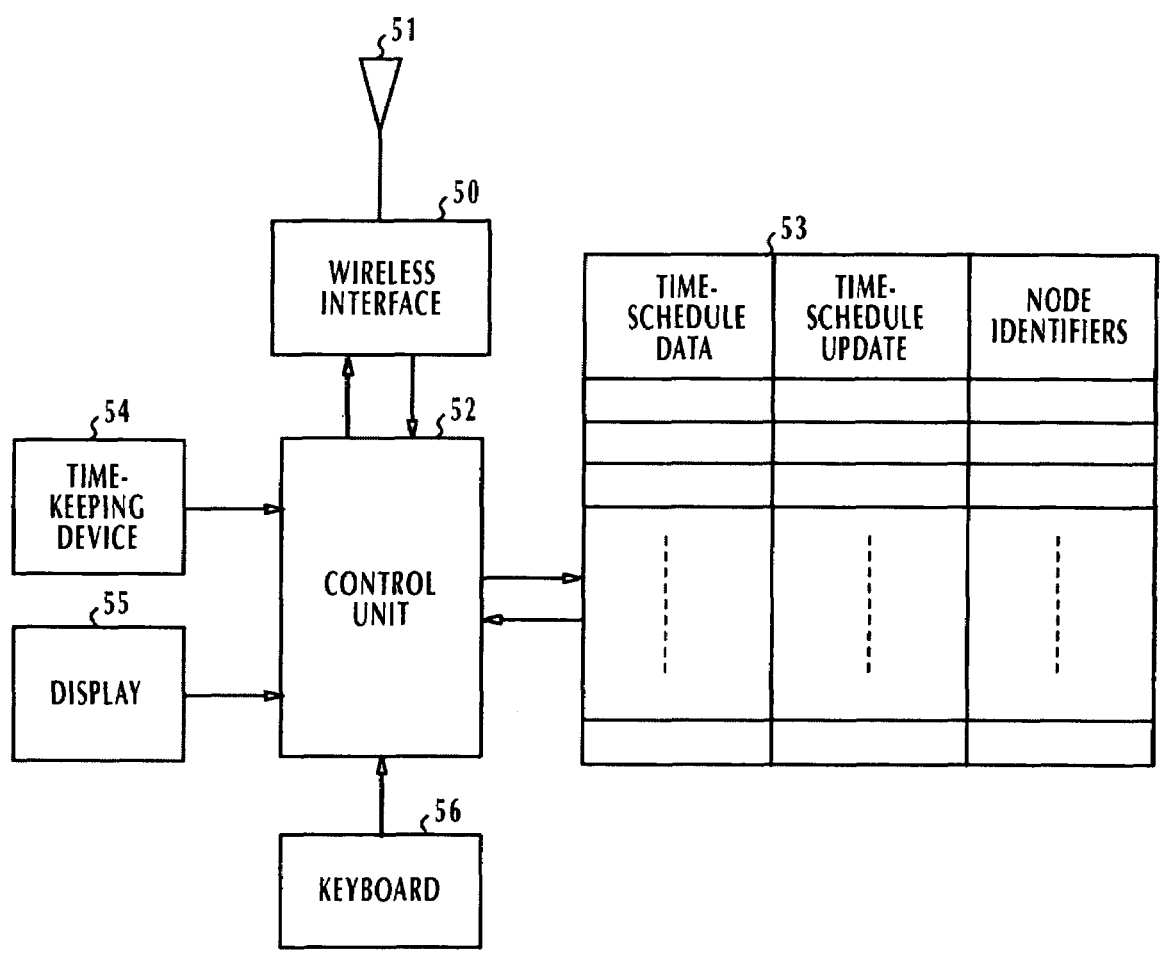
FIG. 9 is a block diagram of the wireless base station.

Details of the wireless base station 10 are shown in FIG. 9. The base station comprises a wireless interface 50 that operates with an antenna 51 to establish wireless links with all the wireless sensor nodes of the telemetering system. A control unit 52 is connected to the wireless interface 50 for transmitting and receiving packets to and from the remote sensor nodes. Connected to the control unit 52 is a time-schedule memory 53 in which a plurality of time-schedule data are mapped to the node identifiers of all wireless sensor nodes in respective entries. Where necessary, a plurality of time-schedule update data are additionally mapped to the node identifiers. A time-keeping device 54, a display unit 55 and a keyboard 56 are connected to the control unit 52. Time-schedule data and measurement commands are manually entered through the keyboard 56 and stored in respective entries of the memory 53.

As shown in FIG. 10, the operation of the base station begins with step 1001 in which the control unit 52 reads time-schedule data from the first entry of the memory 53.

At step 1002, the control unit compares the current time supplied from the time-keeping device 54 to the read time-schedule data of the first node in the memory 53 for detecting a match (step 1003). When they coincide, flow proceeds to step 1004 to determine if time-schedule update data is present. If so, flow proceeds to step 1005 to transmit a command packet to the sensor node of the current entry, containing a measurement command and time-schedule update data. At step 1006, the previous time-schedule data is replaced with the update data. At step 1007, the base station receives an observation packet from the sensor node. At step 1008, the control unit 52 checks to see if the last entry is reached in the memory 53. If not, flow proceeds to step 1009 to read time-schedule data from the next entry of the memory 53 and returns to comparison step 1002.

If no time-schedule update data is present, flow proceeds from step 1004 to step 1010 to transmit a command packet containing a measurement command, and proceeds to step 1007 to receive the returning observation packet. If the last entry is reached (step 1008), flow returns to step 1001.

What is claimed is:

1. A telemetering system comprising:
   a wireless base station; and
   a plurality of wireless sensor nodes, each wireless sensor node including:
   a power source;
   a sensor for producing observation data indicating a quantity being measured;
   a wireless interface for receiving said observation data from the sensor when the wireless interface is activated;
   a time-schedule memory for storing time-schedule data; and
   control circuitry for briefly activating the wireless sensor node by supplying power to said wireless interface from said power source at periodic intervals according to the time-schedule data of said memory to establish a wireless link to the base station to receive time-schedule update data therefrom, and updating the time-schedule memory according to the received time-schedule update data and transmitting the observation data from the activated wireless interface to the base station.

2. The telemetering system of claim 1, wherein all the wireless sensor nodes are activated at times which do not overlap with each other.

3. The telemetering system of claim 1, wherein each of said wireless sensor nodes comprises a node memory for storing an upstream node identifier and at least one downstream node identifier, and wherein said control circuitry is configured to receive a packet from said base station when said wireless interface is briefly activated and forward the received packet to a downstream wireless sensor node if said received packet contains node identifiers corresponding to the node identifiers stored in said node memory.

4. The telemetering system of claim 1, wherein said control circuitry is configured to instruct said sensor to process measured quantity according to a measurement command to produce said observation data, and wherein said base station is configured to transmit the measurement command to each said wireless sensor node during the time the wireless sensor node is briefly activated.

5. The telemetering system of claim 1, wherein said time-schedule data comprises offset data indicating an offset time from a reference time and period data indicating a period between successive times at which the wireless interface is activated.

6. The telemetering system of claim 1, wherein said control circuitry comprises:
   a packet processor connected to said wireless interface for establishing a wireless link with said base station when the packet processor is activated for setting the time-schedule data into said time-schedule memory;
   a time-keeping device for producing data indicating a time of day; and
   a power saving controller for briefly activating said packet processor and said wireless interface when the time of day of said time-keeping device coincides with each of a plurality of time instants indicated by the time-schedule data of said time-schedule memory.

7. The telemetering system of claim 6, wherein said packet processor is configured to:
   receive a routing packet from said base station and store node identifiers into said node memory according to said routing packet;
   receive a power saving packet from said base station and set time-schedule data contained in the received packet into said time-schedule memory; and
   receive a command packet from said base station when the wireless interface is briefly activated and update the time-schedule memory if the command packet contains said time-schedule update data.

8. The telemetering system of claim 7, wherein said command packet further contains the measurement command, and wherein said packet processor is configured to instruct said sensor to process measured quantity according to the measurement command of the command packet.

9. The telemetering system of claim 1, wherein said plurality of wireless sensor nodes are geographically divided into a plurality of groups, and wherein said wireless base station is configured to respectively set the time-schedule data into the time-schedule memories of all of said wireless sensor nodes so that all the wireless sensor nodes of the same group are activated at times which do not overlap with each other.

10. The telemetering system of claim 1, wherein said plurality of wireless sensor nodes are geographically divided into a plurality of groups, and wherein said wireless base station is configured to respectively set the time-schedule data into the memory of all of said wireless sensor nodes so that the wireless sensor nodes of all of said groups are activated at times which do not overlap with each other.

11. The telemetering system of claim 1, wherein said power source comprises a solar cell.

12. A method of operating a plurality of wireless sensor nodes from a wireless base station, wherein each of said wireless sensor nodes includes a sensor for producing observation data indicating a quantity being measured, a wireless interface for establishing an individual wireless link to said base station when the wireless sensor node is activated, and a time-schedule memory, the method comprising the steps of:
- a) establishing a wireless link between said wireless base station and each of the sensor nodes and receiving, at each sensor node, time-schedule data from the base station, and setting the time-schedule data into the time-schedule memory of each sensor node;
- b) briefly activating each sensor node by supplying power from a power source to the wireless interface at periodic intervals according to the time-schedule data of said time-schedule memory to establish a wireless link between each sensor node and said base station;
- c) transmitting, from said base station, time-schedule update data to each briefly activated sensor node via said wireless link;
- d) receiving, at each of the briefly activated sensor nodes, the time-schedule update data;
- e) updating the time-schedule memory with the received time-schedule update data;
- f) transmitting said observation data from each briefly activated sensor node to said base station; and
- g) receiving the transmitted observation data at said base station.

13. The method of claim 12, wherein the step (a) comprises respectively setting the time-schedule data from said base station into the time-schedule memories of all of said sensor nodes so that all the sensor nodes are briefly activated at times which do not overlap with each other.

14. The method of claim 12, wherein each said wireless sensor node comprises a node memory for storing an upstream node identifier and at least one downstream node identifier, and further comprising the steps of receiving a packet from said base station at said briefly activated sensor node and forwarding the packet to a downstream wireless sensor node if said packet contains node identifiers corresponding to the node identifiers stored in said node memory.

15. The method of claim 12, further comprising the steps of:
transmitting, from said base station, a measurement command to the briefly activated sensor node;
receiving said measurement command at said briefly activated sensor node;
instructing the sensor to process measured quantity according to the measurement command to produce said observation data.

16. The method of claim 12, wherein said time-schedule data stored in said time-schedule memory comprises offset data indicating an offset time from a reference time and period data indicating a period between successive times at which the wireless sensor node is activated.

17. The method of claim 12, further comprising the steps of:
receiving a routing packet from said base station at said sensor node when the sensor node is constantly activated;
storing node identifiers contained in said routing packet into a node memory;
receiving a power saving packet containing said time-schedule data from said base station at said constantly activated sensor node;
storing the time-schedule data of the power saving packet into said time-schedule memory;
receiving, at the briefly activated sensor node, a command packet from said base station; and
updating the time-schedule memory if the received command packet contains said time-schedule update data.

18. The method of claim 17, wherein said command packet further contains the measurement command, and further comprising the step of instructing said sensor to process measured quantity according to the measurement command of the command packet to produce said observation data.

19. The method of claim 12, further comprising the steps of receiving an observation packet from a downstream node and forwarding the packet to an upstream node when said sensor node is briefly activated.

20. The method of claim 12, wherein said plurality of wireless sensor nodes are geographically divided into a plurality of groups, and wherein all wireless sensor nodes of the same group are briefly activated at times which do not overlap with each other.

21. The method of claim 12, wherein said plurality of wireless sensor nodes are geographically divided into a plurality of groups, and wherein the wireless sensor nodes of all of said groups are briefly activated at times which do not overlap with each other.

22. A method of operating a plurality of wireless sensor nodes from a wireless base station, wherein each of said wireless sensor nodes includes a sensor for producing observation data indicating a quantity being measured, a wireless interface for establishing an individual wireless link to said base station when the wireless sensor node is activated, and a time-schedule memory, the method comprising the steps of:
- a) establishing a wireless link between said wireless base station and each of the sensor nodes and receiving, at each sensor node, time-schedule data from the base stations, and setting time-schedule data into the time-schedule memory of the sensor node;
- b) briefly activating each of the sensor node by supplying power from a power source to the wireless interface at periodic intervals according to the time-schedule data of said time-schedule memory to establish a wireless link between each sensor note and said base station;
- c) transmitting a command packet containing time-schedule update data from said base station to each of the briefly activated sensor nodes;
- d) receiving said command packet at each of the briefly activated sensor nodes;
- e) updating the time-schedule memory of each said sensor node according to the time-schedule update data contained in the received command packet;
- f) transmitting said observation data from each of the briefly activated sensor nodes to said base station; and
- g) receiving, at said base station, the observation data transmitted from each of the briefly activated sensor nodes.

23. The method of claim 22, wherein said command packet contains a measurement command and the step (f) comprises the steps of:
reading said measurement command from the received command packet; and processing the quantity being measured according to the measurement command to produce said observation data.

24. The method of claim 22, further comprising the steps of receiving an observation packet from a downstream node and forwarding the packet to an upstream node when said sensor node is briefly activated.

25. The method of claim 22, wherein each said wireless sensor node comprises a node memory for storing an upstream node identifier and at least one downstream node identifier, and wherein, in each of said wireless sensor nodes, the step (d) further comprises the steps of:
  determining whether said command packet is destined for a downstream wireless sensor node;
  if said command packet is destined for the downstream wireless sensor node, determining whether said command packet contains node identifiers corresponding to the node identifiers stored in said node memory; and
  if said command packet contains said corresponding node identifiers, forwarding the command packet to the downstream wireless sensor node.

26. The method of claim 25, further comprising the steps of:
  determining whether said command packet contains time-schedule update data of the downstream wireless sensor node; and
  if said command packet contains said time-schedule update data of the downstream wireless sensor node, updating the time-schedule memory of the local wireless sensor node with the time-schedule update data of the downstream wireless sensor node.

27. The method of claim 22, wherein said time-schedule data of step (a) comprises a timing offset value and a period value, and wherein the step (b) comprises, in each of said wireless sensor nodes, the steps of:
  $b_1$) determining a start timing by adding said timing offset value to a predetermined reference timing;
  $b_2$) comparing a current time of day to the start timing for detecting a match;
  $b_3$) if a match detected at step ($b_2$), activating said wireless interface for a predetermined interval;
  $b_4$) determining a start timing for a next activation of said wireless interface by adding said period value to the previous start timing;
  $b_5$) repeating steps ($b_2$) to ($b_4$) until said wireless interface is activated a predetermined number of times; and
  $b_6$) repeating steps ($b_1$) to ($b_5$) when said wireless interface is activated said predetermined number of times.

28. A wireless sensor node for a telemetering system including a wireless base station which transmits power saving time-schedule data to a plurality of wireless sensor nodes, wherein said wireless sensor node is one of said plurality of wireless sensor nodes, said wireless sensor node comprising:
  a power source;
  a sensor for producing observation data indicating a quantity being measured;
  a wireless interface for receiving said observation data from the sensor when the wireless interface is activated;
  a time-schedule memory for storing time-schedule data; and
  control circuitry for briefly activating the wireless sensor node by supplying power from said power source to said wireless interface at periodic intervals according to the time-schedule data of said memory to establish a wireless link to the base station to receive time-schedule update data therefrom, and updating the time-schedule memory according to the received time-schedule update data and transmitting the observation data from the activated wireless interface to the base station through said established wireless link.

29. The wireless sensor node of claim 28, wherein said control circuitry comprises a node memory for storing an upstream node identifier and at least one downstream node identifier, and wherein said control circuitry is configured to receive a packet from said base station when said wireless sensor node is briefly activated and forward the received packet to a downstream wireless sensor node if said received packet contains node identifiers corresponding to the node identifiers stored in said node memory.

30. The wireless sensor node of claim 28, wherein said control circuitry is configured to receive a measurement command from said base station when said wireless sensor node is briefly activated and instruct said sensor to process measured quantity according to the received measurement command to produce said observation data.

31. The wireless sensor node of claim 28, wherein said time-schedule data stored in said time-schedule memory comprises offset data indicating an offset time from a reference time and period data indicating a period between successive times at which the wireless sensor node is activated.

32. The wireless sensor node of claim 28, wherein said control circuitry comprises:
  a packet processor connected to said wireless interface for establishing a wireless link with said base station when the packet processor is activated for setting the time-schedule data into said time-schedule memory;
  a time-keeping device for producing data indicating a time of day; and
  a power saving controller for briefly activating said packet processor and said wireless interface when the time of day of said time-keeping device coincides with each of a plurality of time instants indicated either by the time-schedule data and the time-schedule update data of said time-schedule memory.

33. The wireless sensor node of claim 32, wherein said packet processor is configured to:
  receive a routing packet from said base station and store node identifiers into said node memory according to said routing packet;
  receive a power saving packet from said base station and set the time-schedule data into said time-schedule memory according to said power saving packet; and
  receive a command packet containing said time-schedule update data from said base station when the wireless interface is briefly activated and update the time-schedule memory according to said time-schedule update data of the command packet.

34. The wireless sensor node of claim 33, wherein said command packet further contains the measurement command, and wherein said packet processor is configured to instruct said sensor to process measured quantity according to the measurement command of the command packet.

35. The wireless sensor node of claim 28, wherein said power source comprises a solar cell.

36. The telemetering system according to claim 7, wherein the packet processor is configured to distinguish between a routing packet, a power saving packet, and a command packet based on a packet type field provided at a predetermined position within the received packet.

37. The method according to claim 17, wherein each of the wireless sensor nodes is configured to distinguish between a routing packet, a power saving packet, and a command packet based on a packet type field provided at a predetermined position within the received packet.

38. The wireless sensor node according to claim 33, wherein the packet processor is configured to distinguish between a routing packet, a power saving packet, and a command packet based on a packet type field provided at a predetermined position within the received packet.

* * * * *